(12) United States Patent
Chen et al.

(10) Patent No.: US 6,941,038 B2
(45) Date of Patent: Sep. 6, 2005

(54) TUNABLE OPTICAL FIBER WITH COMPRESSION RING

(75) Inventors: Ga-Lane Chen, Fremont, CA (US); Charles Leu, Fremont, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 62 days.

(21) Appl. No.: 10/397,468

(22) Filed: Mar. 25, 2003

(65) Prior Publication Data

US 2004/0190824 A1 Sep. 30, 2004

(51) Int. Cl.[7] .............................. G02B 6/26; G02B 6/42; G02B 27/00
(52) U.S. Cl. .............................. 385/25; 385/39; 385/49; 359/578; 359/579
(58) Field of Search .............................. 385/25–28, 10, 385/30, 129–132, 1–4, 31, 39–40, 11, 141–145, 8, 9, 12, 37, 24, 14, 136–137, 123, 49–52; 359/577–579, 590, 290–291, 230; 372/20

(56) References Cited

U.S. PATENT DOCUMENTS

| | | | |
|---|---|---|---|
| 5,175,115 A | | 12/1992 | Abe et al. |
| 5,241,417 A | | 8/1993 | Sekiguchi |
| 5,606,633 A | * | 2/1997 | Groger et al. ................. 385/12 |
| 5,944,964 A | | 8/1999 | Solberg et al. |
| 5,982,961 A | * | 11/1999 | Pan et al. ...................... 385/30 |
| 6,156,623 A | | 12/2000 | Hendrix et al. |
| 6,269,202 B1 | * | 7/2001 | Lee et al. ...................... 385/24 |
| 6,341,039 B1 | * | 1/2002 | Flanders et al. ............ 359/578 |
| 6,396,632 B1 | * | 5/2002 | Liu et al. ..................... 359/579 |
| 6,438,288 B1 | * | 8/2002 | Tehrani ....................... 385/27 |
| 6,507,438 B2 | * | 1/2003 | Bhagavatula ................ 359/578 |
| 6,707,609 B2 | * | 3/2004 | Ryall et al. ................. 359/578 |
| 6,798,929 B2 | * | 9/2004 | Chen et al. ..................... 385/1 |

* cited by examiner

Primary Examiner—Frank G. Font
Assistant Examiner—Ryan Lepisto
(74) Attorney, Agent, or Firm—Wei Te Chung

(57) ABSTRACT

A tunable optical filter (30) includes a thin film waveguide (10) and a ring (308) surrounding the thin film waveguide. The ring can be mechanically pressed inwardly toward or pulled outwardly away from the thin film waveguide by external radial forces (306). A central wavelength of the tunable optical filter can be tuned according to the external radial forces. The thin film waveguide includes a substrate (102) and a multi-layered thin film (104) deposited on the substrate. The multi-layered thin film includes high refractive index layers (106) and low refractive index layers (108) alternately superposed on one another to form the multi-layered structure.

20 Claims, 2 Drawing Sheets

TUNABLE OPTICAL FIBER WITH COMPRESSION RING

BACKGROUND OF THE INVENTION

1. Field of the Invention

The present invention relates to tunable optical filters used in telecommunications applications such as Dense Wavelength Division Multiplexing (DWDM), and more particularly to a multi-layered thin film tunable optical filter.

2. Description of the Related Art

Generally, an optical filter comprises a multi-layered thin film, and utilizes interference of incident light in a multi-layered structure to selectively pass or transmit a particular wavelength range of the incident light. The conventional thin film optical filter has a multi-layered structure of non-metallic materials having different refractive indexes, the layers being formed on a glass substrate by vacuum evaporation. Each layer has a given thickness and a different refractive index to form a filter having a specific filtering characteristic for a given wavelength.

DWDM is an essential technology needed to meet the growing demand for increased communications system capacity. Current DWDM technology requires at least one filter for one DWDM channel. Each channel includes one filter, one multi-fiber collimator and one single-fiber collimator. Therefore, the more channels there are, the more filters are required. Thus conventional DWDM systems are very expensive and bulky. In addition, mechanical and optical reliability is limited due to there being a great many three-port devices in the system.

A tunable optical filter can be provided to resolve the abovementioned problems. The tunable optical filter can selectively add or drop particular wavelength channels from a multi-wavelength network.

SUMMARY OF THE INVENTION

Accordingly, it is an object of the present invention to provide a tunable optical filter using a multi-layered thin film which has the capability to tune a desired central wavelength in an operating environment.

In order to achieve the above object, a tunable optical filter in accordance with the present invention comprises a thin film waveguide and a ring surrounding the thin film waveguide. The ring can be mechanically pressed inwardly toward or pulled outwardly away from the thin film waveguide by external radial forces. A central wavelength of the tunable optical filter can be tuned by the external radial forces. The thin film waveguide comprises a substrate and a multi-layered thin film deposited on the substrate. The multi-layered thin film comprises high refractive index layers and low refractive index layers alternately superposed on one another to form the multi-layered structure.

Other objects, features and advantages of the present invention will become apparent from the following detailed description when read in conjunction with the accompanying drawings in which:

DETAILED DESCRIPTION OF THE PREFERRED EMBODIMENT

Hereinafter, the invention will be described in detail with reference to the drawings.

Figure 1:
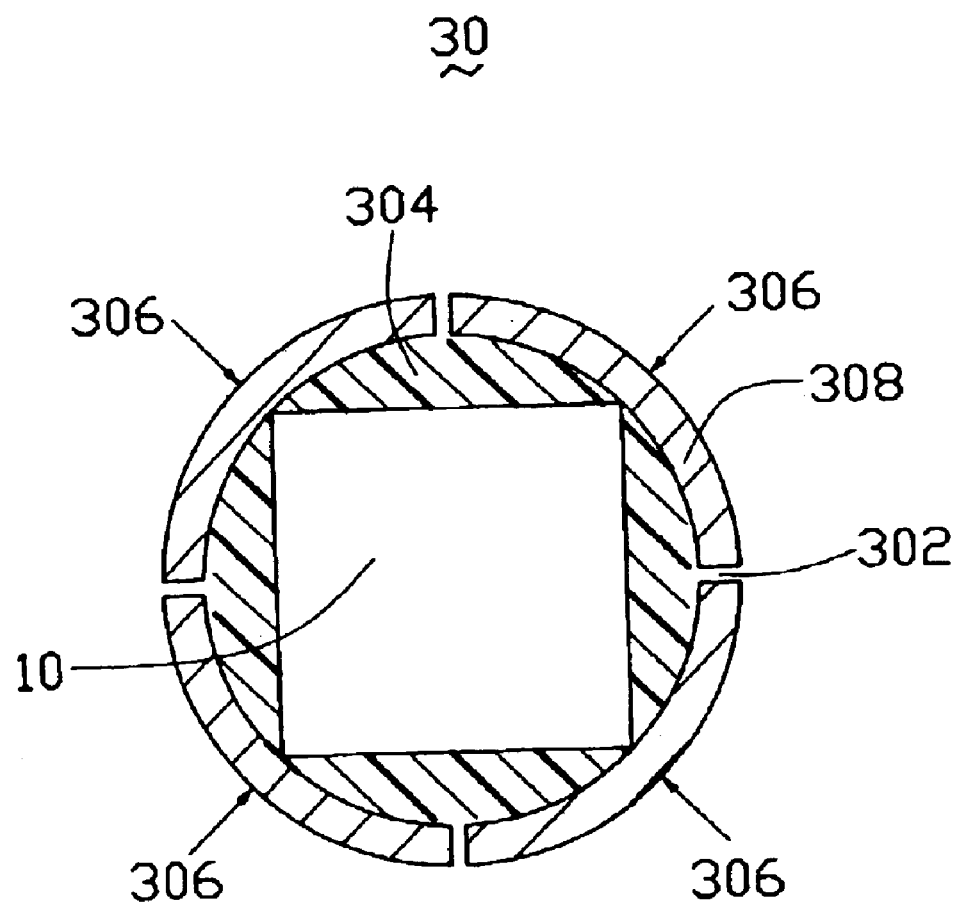
FIG. 1 is a schematic, cross-sectional view of a multi-layered thin film tunable optical filter in accordance with the present invention.

Referring to FIG. 1, a multi-layered thin film tunable optical filter 30 in accordance with the present invention comprises a thin film waveguide 10, and a ring 308 surrounding the thin film waveguide 10.

Figure 2:
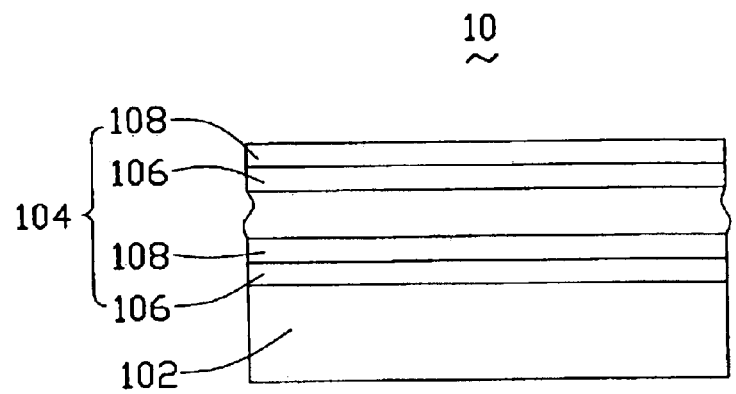
FIG. 2 is a schematic, abbreviated side elevation view of a multi-layered thin film of the tunable optical filter of FIG. 1.

Referring to FIG. 2, the thin film waveguide 10 comprises a substrate 102 and a multi-layered thin film 104 deposited on the substrate 102. The substrate 102 comprises silica-based glass. The multi-layered thin film 104 comprises high refractive index layers 106 and low refractive index layers 108 alternately superposed on one another to form the multi-layered structure. Each high refractive index layer 106 comprises an optical material or dielectric material of high refractive index such as tantalum pentoxide ($Ta_2O_5$). Each low refractive index layer 108 comprises another optical material of low refractive index such as silicon dioxide ($SiO_2$).

In accordance with a preferred embodiment of the present invention, a total of between 100 and 150 high and low refractive index layers 106, 108 are deposited on the substrate 102. For most optical applications, the thin film materials are inorganic materials, usually consisting of metals, metal oxides (titanium dioxide, zirconium dioxide, etc.) and metal nitrides (silicon nitride, aluminum nitride, boron nitride, etc.). Other thin film materials include carbides (silicon carbide, germanium carbide, etc.), fluorides, mixtures of metal oxides, or mixtures of oxides and fluorides.

The multi-layered thin film 104 can be formed by depositing various optical or dielectric materials on the substrate 102 using known semiconductor manufacturing processes such as ion plating deposition, ion beam sputter deposition, chemical vapor deposition, magnetron sputtering and ion assist vacuum evaporation.

The stiff ring 308 comprises a plurality of evenly spaced curved portions. Each two adjacent curved portions are separated by a gap 302. The gaps 302 allow the curved portions to be radially pressed toward a middle of the thin film waveguide 10. The ring 308 is bonded to the thin film waveguide 10 with epoxy 304 or an equivalent adhesive material. The epoxy 304 soft relative to the ring, is preferably thermally-cured epoxy. The curved portions of the ring 308 can be mechanically pressed inwardly toward or pulled outwardly away from the thin film waveguide 10 by external radial forces 306. When the external radial forces 306 are transmitted into the thin film waveguide 10, the external radial forces 306 can control nanostrain of the thin film 104.

Refractive indexes of the high and low refractive index layers 106, 108 of the thin film 104 are a function of nanostrain in the layers 106, 108. Therefore, a central wavelength (CWL) of the tunable optical filter 30 is a function of the nanostrain in the thin film 104 of the thin film waveguide 10. Different external radial forces 306 applied to the thin film 104 result in different nanostrain in the thin film 104. Therefore, the CWL of the tunable optical filter 30 can be tuned by adjusting the external radial forces 306.

When the external radial forces 306 are applied on the thin film waveguide 10, they produce a desired refractive index in each high and low refractive index layer 106, 108. An optical thickness of each high and low refractive index layer 106, 108 is changed accordingly. Thus, a desired optical wavelength equal to twice the combined optical thickness of two optically adjacent high refractive index layers 106 or two optically adjacent low refractive index layers 108 can be selected to pass through the thin film waveguide 10.

The CWL of the tunable optical filter 30 can be tuned to a required value corresponding to a desired combined optical thickness of two optically adjacent high refractive index layers 106 or two optically adjacent low refractive index layers 108 of the thin film waveguide 10 according to the International Telecommunications Union (ITU) Grid. The CWL can provide sub-nano channel spacing. It can be tuned to 0.8 nanometer channel spacing for a 100 GHz DWDM system, and 0.4 nanometer channel spacing for a 50 GHz DWDM system.

It should be noted that, in use, the tunable optical filter 30 may be arranged in combination with other optical members or optical elements.

Figure 3:
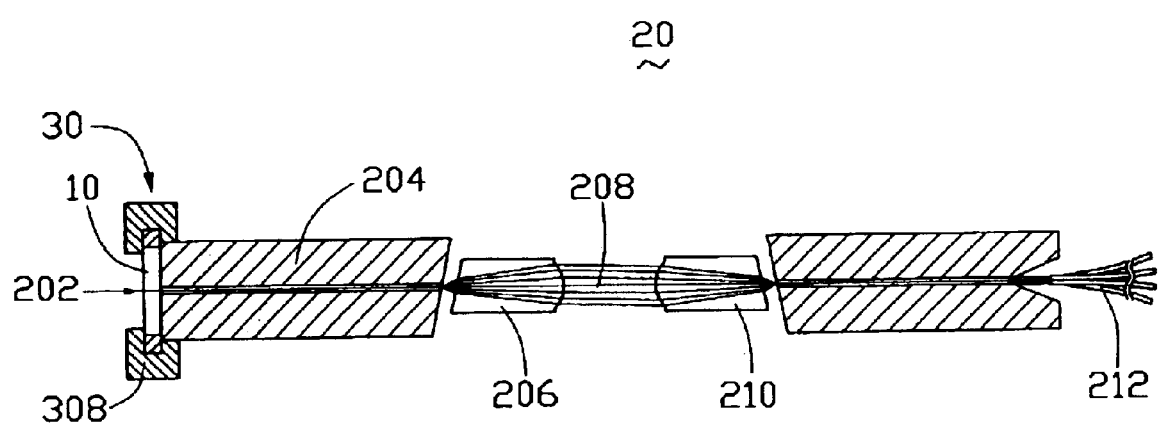
FIG. 3 is a schematic, cross-sectional view of an optical system incorporating the tunable optical filter of FIG. 1, showing optical transmission paths in the optical system both before and after filtering out of a desired wavelength from an incident light beam.

FIG. 3 shows optical transmission paths in an optical system 20 after the filtering out of a desired wavelength from incident light beams 202. Incident light beams 202 having different wavelengths and originating from the same or different input channels are transmitted into the tunable optical filter 30. By operation of the tunable filter 30 as described above, light beams 208 whose wavelengths are equal to twice that of the combined optical thickness of two optically adjacent high refractive index layers 106 or two optically adjacent low refractive index layers 108 of the multi-layered thin film 104 can be selected to pass through a standard waveguide 204. In contrast, other light beams of the incident light beams 202 whose wavelengths are not equal to twice of either of said optical thicknesses cannot pass through the multi-layered thin film 104. The light beams 208 then pass through a first collimating lens 206 to be collimated into parallel light beams 208. The parallel light beams 208 pass through a second collimating lens 210 to be focused directly into an entry face of a predetermined output channel 212.

The tunable optical filter 30 of the present invention can be rapidly tuned to the wavelength of a desired output channel, and has the capability to manage multiple wavelengths for various different channels. Therefore, a DWDM system incorporating the tunable optical filter 30 can be simpler and can occupy less space than conventional DWDM systems.

It will be understood that the particular devices embodying the present invention are shown and described by way of illustration only, and not as limiting the invention. The principles and features of the present invention may be employed in various and numerous embodiments thereof without departing from the scope of the invention.

What is claimed is:

1. A tunable optical filter, comprising:
    a thin film waveguide; and
    a discontinuous ring-shaped device substantially surrounding the thin film waveguide;
    wherein the ring-shaped device can be mechanically pressed inwardly toward or pulled outwardly away from the thin film waveguide by external radial forces, and a central wavelength of the tunable optical filter can be tuned according to the external radial forces.

2. The tunable optical filter according to claim 1, wherein the ring-shaped device defines at least one gap therein.

3. The tunable optical filter according to claim 2, wherein the thin film waveguide comprises a substrate and a multi-layered thin film deposited on the substrate.

4. The tunable optical filter according to claim 3, wherein the substrate comprises silica-based glass.

5. The tunable optical filter according to claim 3, wherein the multi-layered thin film comprises high refractive index layers arid low refractive index layers alternately superposed on one another to form the multi-layered structure.

6. The tunable optical filter according to claim 5, wherein the high refractive index layers comprise tantalum pentoxide.

7. The tunable optical filter according to claim 5, wherein the low refractive index layers comprise silicon dioxide.

8. The tunable optical filter according to claim 1, wherein the ring-shaped device is bonded to the thin film waveguide with epoxy or equivalent adhesive material.

9. An optical system comprising:
    a tunable optical filter comprising:
    a thin film waveguide; and
    a discontinuous ring-shaped device substantially surrounding the thin film waveguide; and
    output means arranged adjacent the tunable optical filter;
    wherein the discontinuous ring-shaped device can be mechanically pressed inwardly toward or pulled outwardly away from the thin film waveguide by external radial forces, and a central wavelength of the tunable optical filter can be tuned according to the external radial forces.

10. The optical system according to claim 9, wherein the ring-shaped device defines at least one gap therein.

11. The optical system according to claim 10, wherein the ring-shaped device is bonded to the thin film waveguide with epoxy or equivalent adhesive material.

12. The optical system according to claim 10, wherein the optical system is a Dense Wavelength Division Multiplexing system.

13. The optical system according to claim 10, wherein the thin film waveguide comprises a substrate and a multi-layered thin film deposited on the substrate.

14. The optical system according to claim 13, wherein the substrate comprises silica-based glass.

15. The optical system according to claim 13, wherein the multi-layered thin film comprises high refractive index layers and low refractive index layers alternately superposed on one another to form the multi-layered structure.

16. The optical system according to claim 15, wherein the high refractive index layers comprise tantalum pentoxide.

17. The optical system according to claim 15, wherein the low refractive index layers comprise silicon dioxide.

18. A tunable optical filter comprising:
    a thin film waveguide; and
    a peripheral discontinuous ring-shaped device substantially encircling the thin film waveguide, said device including a stiff outer device and a soft inner device; wherein
    said peripheral device is able to be inwardly or outwardly displaced to generate inward or outward forces upon the thin film waveguide to tune a center wavelength of said filter.

19. The tunable optical filter according to claim 18, wherein said peripheral device defines at least one gap therein.

20. The tunable optical filter according to claim 18, wherein outer device defines at least one gap therein.

* * * * *